United States Patent [19]

Paine et al.

[11] 4,290,711
[45] Sep. 22, 1981

[54] KEY SYSTEM FOR SHAFT AND GEAR OR THE LIKE

[75] Inventors: Ellis H. Paine, Woodstock; Roger E. Anderson, Brooklyn, both of Conn.

[73] Assignee: Moldex, Inc., Putnam, Conn.

[21] Appl. No.: 109,977

[22] Filed: Jan. 7, 1980

[51] Int. Cl.³ .............................................. F16D 1/08
[52] U.S. Cl. .................................... 403/358; 403/318
[58] Field of Search .............. 403/356, 358, 357, 318, 403/319, 355, 350, 351, 352

[56] References Cited

U.S. PATENT DOCUMENTS

| | | | |
|---|---|---|---|
| 1,094,442 | 4/1914 | Hoerr | 403/356 X |
| 1,412,235 | 4/1922 | Felix | 403/358 X |
| 3,206,236 | 9/1965 | Darling | 403/356 |

FOREIGN PATENT DOCUMENTS

| | | | |
|---|---|---|---|
| 2203765 | 8/1973 | Fed. Rep. of Germany | 403/356 |
| 1420242 | 10/1965 | France | 403/356 |

Primary Examiner—Andrew V. Kundrat
Attorney, Agent, or Firm—Harold L. Stults; Pasquale A. Razzano

[57] ABSTRACT

A construction for locking the hub of a gear or other means to a shaft. The shaft is cylindrical but is cut away to form a flat surface parallel to the axis of the hub. A wedge has a portion which fills the cavity between the cylindrical inside surface of the hub and the flat surface on the shaft. An integral lug portion of the wedge extends radially outwardly into a slot in the hub so as to prevent the hub from turning with respect to the wedge. The wedge is prevented from turning with respect to the shaft by its flat bottom surface which is coextensive with the flat surface on the shaft. That provides a driving relationship between the hub and the shaft. The driving relationship between the wedge and the hub is through side surfaces of the cavity in the hub and the lug portion of the wedge.

8 Claims, 4 Drawing Figures

KEY SYSTEM FOR SHAFT AND GEAR OR THE LIKE

This invention relates to constructions formed by a shaft portion, a gear or other unit mounted thereon through a hub with there being means locking the hub in fixed relationship to the shaft.

An object of this invention is to provide an improved combination of a shaft and a hub. A further object is to provide for the above wherein a small nylon gear is mounted upon a steel shaft. A still further object is to provide for the above in such a manner as to permit the ready assembly of the construction, and the removal of the shaft from the hub. A further object is to provide for the above with constructions which are adaptable to various limitations and conditions of use, particularly those encountered in mechanisms in business and industrial machines and instruments. These and other objects will be in part obvious and in part pointed out below.

Referring to the drawings showing one embodiment of the invention:

Figure 1:
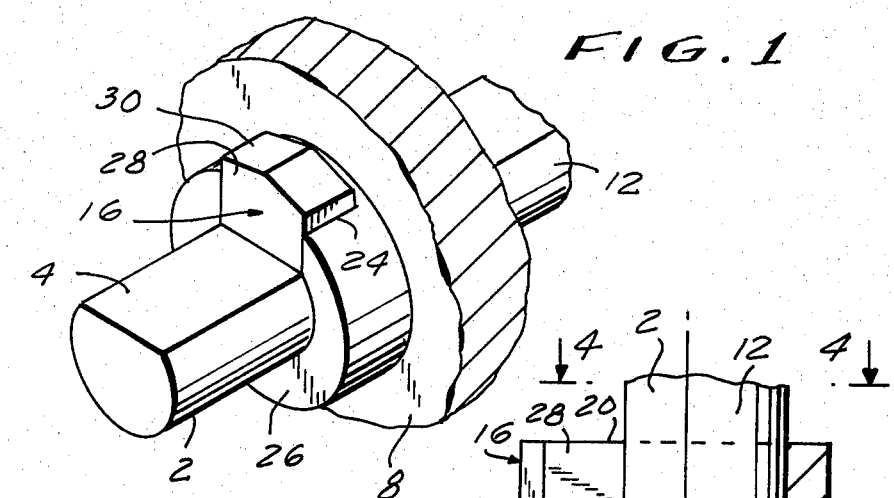
FIG. 1 is a perspective view of the construction.
Figure 2:
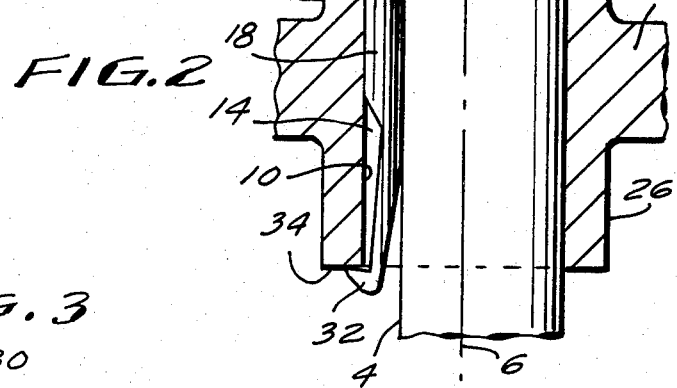
FIG. 2 is a vertical section through the common axis of the shaft and hub of FIG. 1.
Figures 3, 4:
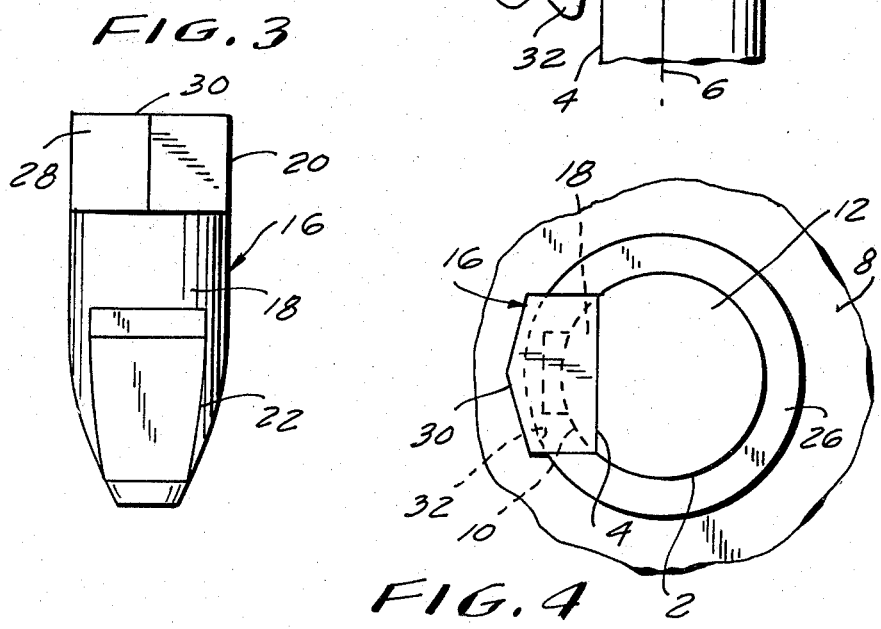
FIG. 3 is a plan view of the wedge of FIGS. 1 and 2.
FIG. 4 is a sectional view on the line 4—4 of FIG. 2.

Referring to FIGS. 1 and 2 of the drawings, a cylindrical shaft 2 has a flat surface 4 which is parallel to the shaft axis 6, and is tangential to an imaginery cylinder (not shown) having axis 6 and of lesser diameter than shaft 2. A hub 8 is the hub of a gear and has an internal cylindrical surface 10 which mates with the outer surface 12 of shaft 2, with a cavity 14 between surface 4 of shaft 2 and the internal surface 10 of the hub. Positioned in cavity 14 is a wedge 16 (see also FIG. 3) which has a central portion 18 which is snugly received in cavity 14 and end portions 20 and 22. Portions 18 and 20 have a flat bottom surface which is coextensive with the adjacent portion of shaft surface 4, and portion 18 has a top surface which is coextensive with the adjacent portion of hub surface 10. As shown best in FIG. 1, hub 8 has a rectangular slot 24 extending radially inwardly from its end wall 26 and radially outwardly from shaft surface 4. Wedge portion 20 has a lug extension 28 (see FIG. 2) which extends radially outwardly and is snugly received in slot 24. The top of lug portion 28 has a gable stop portion 30 (FIG. 2) which extends upwardly beyond the top surface of the hub. Wedge portion 22 extends from portion 18 to the end of cavity 14 and has a latch extension 32 which extends radially outwardly along the end face 34 of the hub. Wedge 16 is of nylon and is sufficiently flexible to permit wedge portion 22 to be flexed radially inwardly when the wedge is projected into cavity 14. The wedge portion 22 then urges its latch portion 32 to the position shown when the wedge is fully in place. Hence, the wedge can be readily installed in cavity 14 by inserting it at surface 26, and it can be removed by pushing latch portion 32 toward shaft surface 4 and then exerting forces on the latch portion and on the top of lug portion 28 of the wedge.

With the construction assembled as shown, hub 8 and shaft 2 are locked together by wedge 16 and the shaft may be driven by the hub or vice versa, with the driving forces being exerted through wedge 16. The driving forces between hub 8 and wedge 16 are between the coextensive side faces of lug 28 and slot 24 in the hub. The driving forces between wedge 16 and shaft 2 are between surface 4 on the shaft and the coextensive surface of the wedge. That produces a twisting action between lug 28 of the wedge and wedge portion 18 adjacent shaft surface 4. During the turning movement, when the shaft is driven, the bottom surface of the wedge on the one-half portion which is leading in the direction of rotation is pressed against surface 4 so that the driving force is exerted over a large area. The twisting action is carried by the cross-section of the wedge at the bottom of lug 28.

The invention contemplates that wedge 16 can be so dimensioned and constructed as to fail in shear when there is an unacceptably high driving force, for example, a driving force which would damage a gear or which will produce an undesirable result in the mechanism which is being driven by or is driving shaft 2. As indicated above, hub 8 is the hub of a nylon gear which meshes with another gear or other gears in the mechanism, and shaft 2 is a polished steel shaft. The terms "hub" and "shaft portion" are used in their broad senses as meaning a combination of driving and driven components where there is a cylindrical bore in the hub which is keyed to a cylindrical member. In the illustrative embodiment, the flexible characteristics of nylon permit the ready asembly of the gear on the shaft, and the ready removal of the gear. In this embodiment, the shaft is of steel, but the invention contemplates that it may be of other material and the hub may be of other material.

What is claimed is:

1. In combination, a shaft portion and a hub mounted thereon, a wedge construction having a body portion with a top surface which is an arcuate segment of a cylinder and a bottom surface which is a flat surface in a plane parallel to the axis of said cylindrical surface, said shaft portion having an outer surface which is an arcuate segment of a cylinder and which compliments the first-named arcuate segment to form a substantially complete cylinder, said shaft portion having a flat surface which is coextensive with the first-named flat surface, said wedge and said hub having interlocking means which present mating surfaces which are positioned radially outwardly from said arcuate segments and which interengage so as to prevent said hub from turning around said axis relative to said wedge, and said hub and said shaft portion are held from turning relative to each other around said axis.

2. The construction described in claim 1 wherein said wedge has latch means which holds said wedge from moving axially of said hub.

3. The construction described in either of claim 1 or 2 wherein said wedge and said hub have interlocking means which is adapted to hold said wedge and said hub from relative movement relative to said axis.

4. In combination with a shaft portion and a hub mounted thereon, a wedge construction having a body portion with a top surface which is an arcuate segment of a cylindrical surface and a flat bottom surface which is in a plane parallel to the axis of said cylindrical surface and is also parallel to a plane which is defined by said shaft; said shaft having an outer surface which is an arcuate segment of a cylinder with its axis concentric with the first-named axis and having substantially the same radius as the first-named cylindrical surface, said shaft portion having a flat surface which is coextensive with the first-named flat surface, said wedge and said hub having interlocking means which persent mating surfaces which are positioned radially outwardly from said cylindrical surfaces and which interengage so as to prevent said hub from turning around said axis relative to said wedge and said hub and said shaft portion are held from turning relative to each other around said axis.

5. The construction described in claim 4 wherein said wedge has latch means which holds said wedge from moving axially of said hub.

6. The construction described in either claim 4 or claim 5 wherein said wedge and said hub have interlocking means which is adapted to hold said wedge and said gear or the like from relative movement in the direction of said axis.

7. A construction comprising the combination of, a steel shaft portion having a flat surface parallel to a predetermined axis, a hub mounted upon said shaft, said hub having a cylindrical inside bore, and said hub and said shaft having substantially coextensive cylindrical surfaces except for the extent of a cavity between said flat surface of said shaft and an internal surface of said hub, said hub having contact surfaces positioned radially outwardly from said cavity with respect to said axis, a wedge having a portion which is complementry to and snugly received in a portion of said cavity and a lug portion which is spaced axially relative to said cavity and which projects radially outwardly with respect to said axis and which has surfaces which engage said contact surfaces of said hub and which prevent relative turning movement between said hub and said shaft about said axis.

8. A mechanical construction comprising, the combination of, a shaft portion having an outside cylindrical surface except for a flat surface in a plane generally parallel to the axis of the cylindrical surface, a hub mounted on said shaft portion and having an inside cylindrical surface mating with the first-named cylindrical surface and with its axis concentric with said axis, and a wedge having a first portion which is dimensioned and shaped to be snugly received between said flat surface on said shaft portion and the coextensive portion of said inside cylindrical surface in said hub, said wedge having a second portion integral with said first portion and positioned in alignment therewith along said flat surface on said shaft portion, said wedge having a third portion integral with said second portion and extending radially outwardly therefrom, said hub having integral means extending parallel to said axis upon the opposite sides of said third portion of said wedge, whereby said wedge is prevented from moving around said axis relative to said hub, and whereby said wedge is prevented from moving around said axis relative to said shaft portion by the engagement between said wedge and said flat surface of said shaft portion.

* * * * *

UNITED STATES PATENT AND TRADEMARK OFFICE
CERTIFICATE OF CORRECTION

PATENT NO. : 4,290,711

DATED : September 22, 1981

INVENTOR(S) : Ellis H. Paine et al

It is certified that error appears in the above—identified patent and that said Letters Patent is hereby corrected as shown below:

Column 2, line 61, after "shaft", insert -- tangential to the longitudinal center of said arcuate segment, --.

Signed and Sealed this

Sixteenth Day of February 1982

[SEAL]

Attest:

GERALD J. MOSSINGHOFF

Attesting Officer

Commissioner of Patents and Trademarks